United States Patent
Mahoney et al.

(10) Patent No.: US 7,009,321 B1
(45) Date of Patent: Mar. 7, 2006

(54) COMPACT TWO-AXIS WIDE GAP TORQUER MOTOR

(75) Inventors: John Mahoney, Petaluma, CA (US); John M. Speicher, Geyserville, CA (US); Allan A. Voigt, Geyserville, CA (US)

(73) Assignee: L-3 Communications Sonoma EO, Inc., Santa Rosa, CA (US)

( * ) Notice: Subject to any disclaimer, the term of this patent is extended or adjusted under 35 U.S.C. 154(b) by 0 days.

(21) Appl. No.: 10/958,478

(22) Filed: Oct. 4, 2004

(51) Int. Cl.
*H02K 3/47* (2006.01)

(52) U.S. Cl. .................... 310/208; 310/90.5; 310/184; 310/198

(58) Field of Classification Search ............ 310/23–24, 310/179–180, 184, 198, 208, 90.5, 112, 205; 318/115; 335/282; 74/5.37, 5.46, 5.47, 74/5.7
See application file for complete search history.

(56) References Cited

U.S. PATENT DOCUMENTS

| | | | |
|---|---|---|---|
| 3,107,540 A * | 10/1963 | Curriston ...................... 74/5.4 |
| 3,451,274 A * | 6/1969 | Davies et al. ............... 74/5.6 D |
| 3,949,162 A | 4/1976 | Malueg |
| 3,950,099 A | 4/1976 | Malueg |
| 4,033,541 A | 7/1977 | Malueg |
| 4,315,610 A | 2/1982 | Malueg |
| 4,398,167 A * | 8/1983 | Dickie et al. ................ 335/272 |
| 4,443,743 A | 4/1984 | Forys et al. |
| 4,464,943 A * | 8/1984 | Andrews et al. ............. 74/5.46 |
| 4,498,038 A | 2/1985 | Malueg |
| 4,683,391 A * | 7/1987 | Higuchi ..................... 310/90.5 |
| 4,747,668 A * | 5/1988 | Meyer et al. ................ 359/210 |
| 4,767,954 A * | 8/1988 | Phillips ........................ 310/12 |
| 4,908,558 A * | 3/1990 | Lordo et al. ................. 318/648 |
| 5,160,877 A * | 11/1992 | Fujiwara et al. ....... 318/568.21 |
| 5,321,986 A * | 6/1994 | Sears et al. .................. 74/5.46 |
| 5,355,041 A * | 10/1994 | Shirao et al. ............. 310/90.5 |
| 5,436,536 A * | 7/1995 | Van Der Wilk et al. ..................... 315/368.25 |
| 6,131,459 A * | 10/2000 | Seale et al. .................... 73/633 |
| 6,384,500 B1 * | 5/2002 | Chassoulier et al. ........ 310/90.5 |
| 6,894,593 B1 * | 5/2005 | Reinicke ....................... 335/78 |
| 6,940,206 B1 * | 9/2005 | Asaba ......................... 310/266 |

FOREIGN PATENT DOCUMENTS

CH 620551 A * 11/1980
JP 08154350 A * 6/1996

* cited by examiner

*Primary Examiner*—Burton Mullins
(74) *Attorney, Agent, or Firm*—Pillsbury Winthrop et al.

(57) ABSTRACT

A novel design concept for a torquer motor is useful for stabilizing apparatuses in a vibrating structure. According to one aspect, a novel design for a coil pair is provided. A first coil in the pair is box shaped with a hollow interior portion and windings provided on a surface opposite the hollow interior. A second coil in the coil pair is flat and torus shaped with windings provided on the surface. According to one example, the second coil is bent so as to conform to the shape of the first coil, and disposed over the first coil so that the respective windings are oriented orthogonally to each other in a common plane direction so as to define an active area. The active area may be further disposed in the magnetic field of a magnet pair in a torquer motor application. The design provides advantages such as inherent rigidity and more efficient heat transfer, while providing high torque or a desired range of movement. Alternative designs consistent with the above approach are disclosed, which provide similar advantages over the prior art.

19 Claims, 8 Drawing Sheets

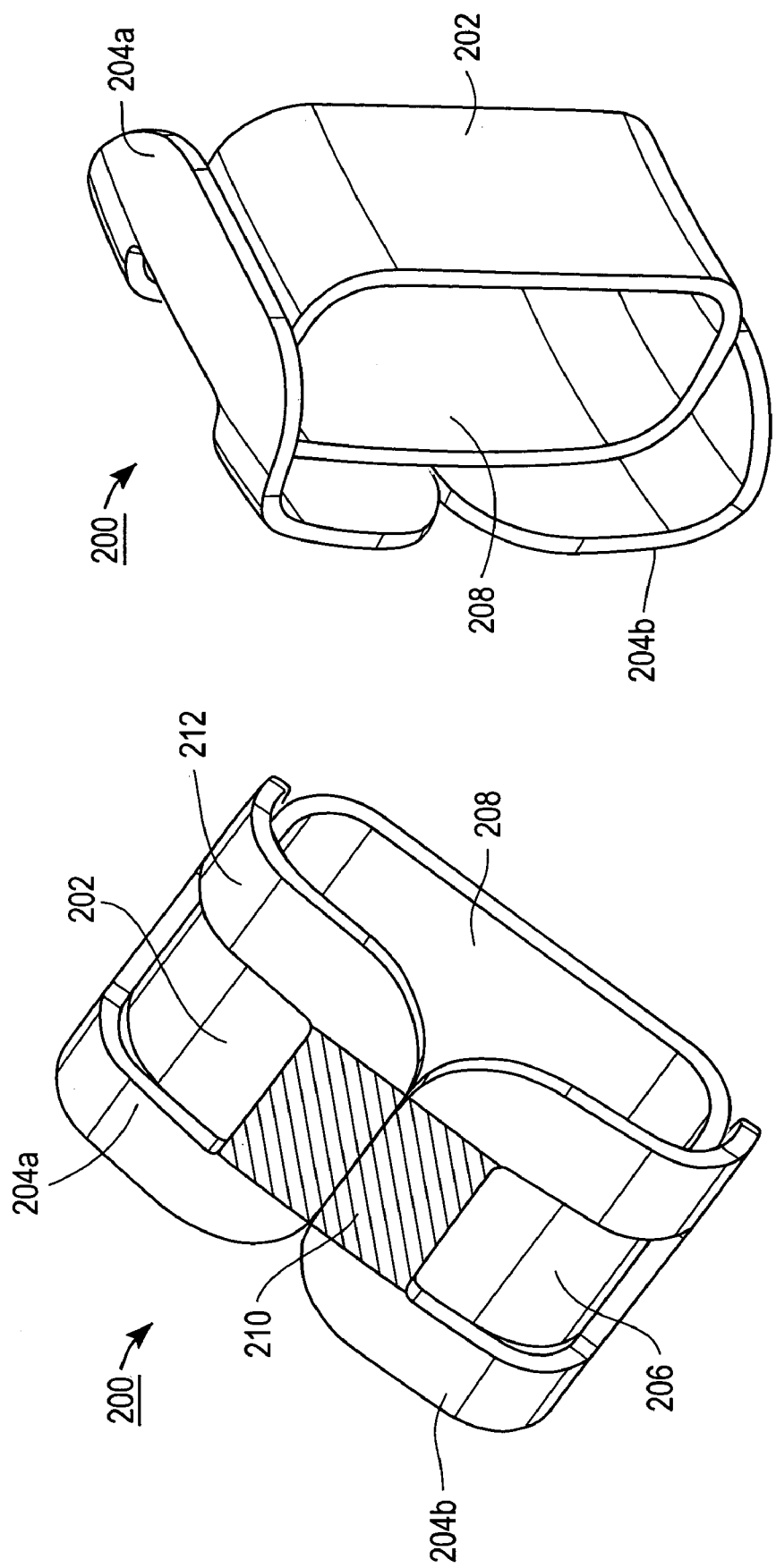

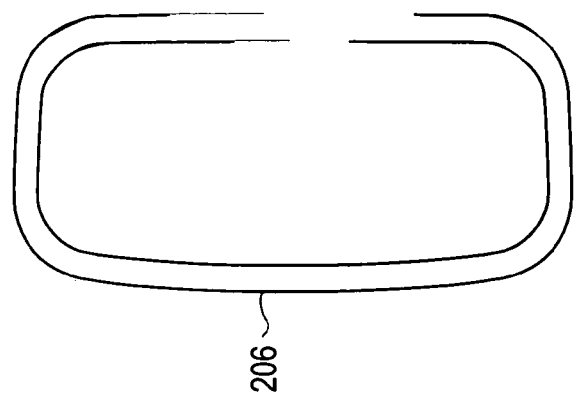
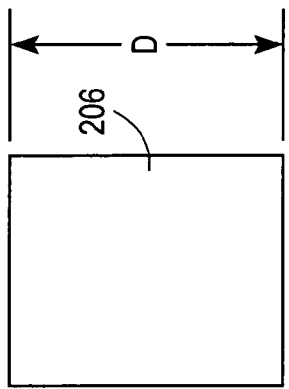
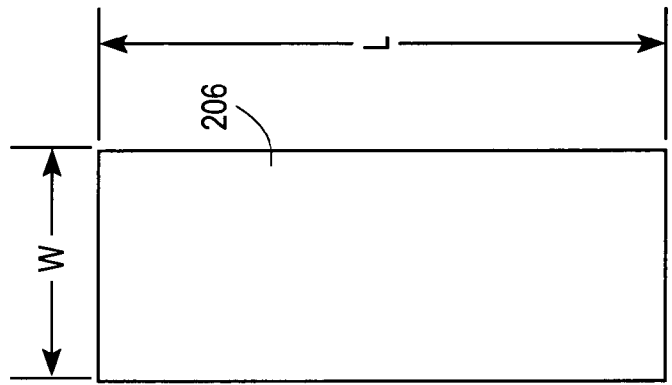
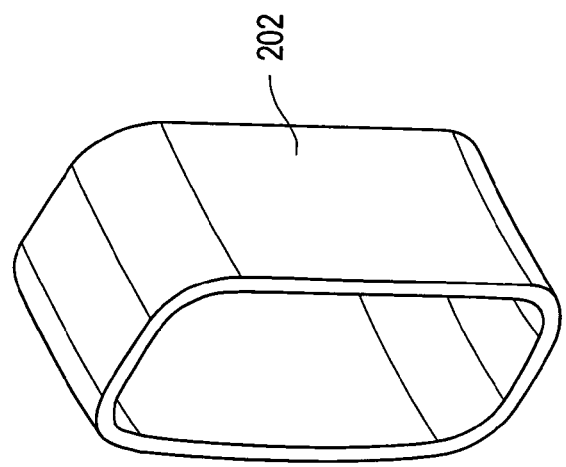

COMPACT TWO-AXIS WIDE GAP TORQUER MOTOR

FIELD OF THE INVENTION

The present invention relates generally to stabilizing apparatuses, and in particular to torquer motors for stabilzing apparatuses within vibrating structures.

BACKGROUND OF THE INVENTION

Torquer motors for stabilizing sensitive apparatuses inside structures from translational and rotational vibrations are known. Such motors typically provide corrective torques to stabilizing members coupled between the vibrating structure and the sensitive apparatus in response to signals from gyroscopes and angular accelerometers mounted on the sensitive apparatus. In one illustrative example, the sensitive apparatus is a package of optical and electronic sensor equipment, and the vibrating structure is a gimbal mounted on a surveillance aircraft.

U.S. Pat. Nos. 4,033,541, 4,315,610, 4,443,743 and 4,498,038 are emblematic of the prior art approaches to such motors, the contents of which are incorporated herein by reference.

FIGS. 1A and 1B illustrate one example of a coil pair for a torquer motor in accordance with prior art approaches. In FIG. 1A, one coil 102a of a two-coil pair for use in a torquer motor is illustrated. In one example, coil 102a is about 0.125 in thick and 1.27 in wide. As further shown in FIG. 1A, coil 102a is comprised of copper windings 104a, each measuring about 0.027 in. on the diameter for example, wound in a counter-clockwise direction in coil 102a. It should be noted that, although only a few windings are shown, there can be, and typically are several hundred or more. It should be further noted that coil 102a may further comprise an epoxy to bind the windings together as is known to those skilled in the art.

FIG. 1B illustrates coil pairs 102a and 102b comprising a coil pair 110 for a torquer motor according to one example of the prior art. As shown in FIG. 1B, coil 102b is mounted atop coil 102a such that their respective windings 104a and 104b overlap each other in orthogonal directions in a common plane direction so as to define an active area 106. The corners of coils 102a and 102b are further typically mounted to an inner gimbal payload structure (not shown, i.e. the apparatus to be stabilized) so as to correct for vibrations induced to the structure and stabilize the apparatus. In a manner consistent with the prior art patents referenced above, the active area 106 is further disposed between the poles of a magnetic element (not shown), the magnetic element being mounted to an outer gimbal (not shown, i.e. the vibrating structure). In particular, depending on signals from gyroscopes and accelerometers (not shown), the amount of relative current in windings 104a and 104b is adjusted so as to control the force resulting from the cross product of the current in the active area 106 and the magnetic field between the poles of the magnetic element, and thus cause relative corrective movement between the vibrating structure and the apparatus to be stabilized.

Although coil pair 110 has certain advantages for use in a torquer motor, there remain problems. First, the mounting of the motor at the corners is difficult because the dimensions of the copper wind are difficult to control within the tolerances of a machined bracket. In addition, the small bond areas at the corners of the coils do not provide rigid mounting. The lack of rigidity causes ringing that is fed back into the system. Still further, the size of the mounted area is limited, such that the heat that is generated in the coils through $I^2R$ losses cannot be effectively cooled by conduction to the bracket.

Moreover, there are certain problems with the conventional torquer motor that have particular consequences for gimbal applications. For example, it can be difficult and very time-consuming to physically make the coils in an optimal fashion because of how the copper windings must arranged to comprise the coils. These winding inefficiencies can lead to inefficiencies in operation of the motor. In particular, for a coil that is used to compensate for vibrations in an important direction such as azimuth, it is very important for the windings in the corresponding coil to be efficient and near optimal. The conventional design, however, does not lend itself to such optimization.

Accordingly, it would be desirable if a novel concept for a torquer motor could be introduced that still provides the required high torque stabilizing forces, but does so with a design that is more compact, easier to mount, has greater structural rigidity, allows for better heat conduction to a mounting bracket or other structure, and leads to optimal performance in certain applications.

SUMMARY OF THE INVENTION

The present invention provides a novel design concept for a torquer motor that is useful for stabilizing apparatuses that are within a vibrating structure. According to one aspect of the invention, a novel design for a coil pair is provided. A first coil in the pair is box shaped with a hollow interior portion and windings provided on a surface opposite the hollow interior. A second coil in the coil pair is flat and torus shaped with windings provided on the surface. According to one example, the second coil is bent so as to conform to the shape of the first coil, and disposed over the first coil so that the respective windings are oriented orthogonally to each other in a common plane direction so as to define an active area. The active area may be further disposed in the magnetic field of a magnet pair in a torquer motor application. The design provides advantages such as inherent rigidity and more efficient heat transfer, while providing high torque over a desired range of movement. Alternative designs consistent with the above approach are disclosed, which provide similar advantages over the prior art.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIGS. 2A and 2B are perspective drawings of a coil pair for a torquer motor in accordance with one example of the present invention;

FIGS. 3A to 3D are different detailed views of a first coil in a coil pair in accordance with one example of the present invention such as that illustrated in FIGS. 2A and 2B;

DETAILED DESCRIPTION OF THE PREFERRED EMBODIMENTS

Figure 1A:
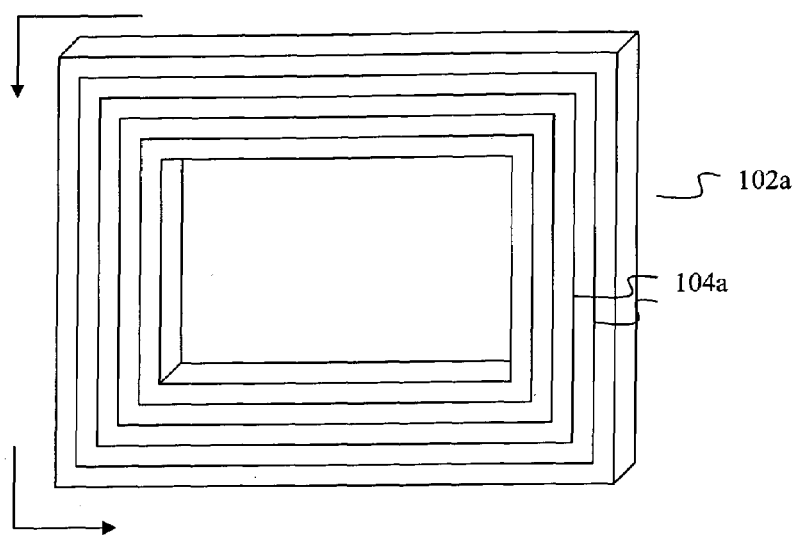
FIGS. 1A and 1B illustrates examples of coil pairs for torquer motors in accordance with prior art principles.
Figure 1B:
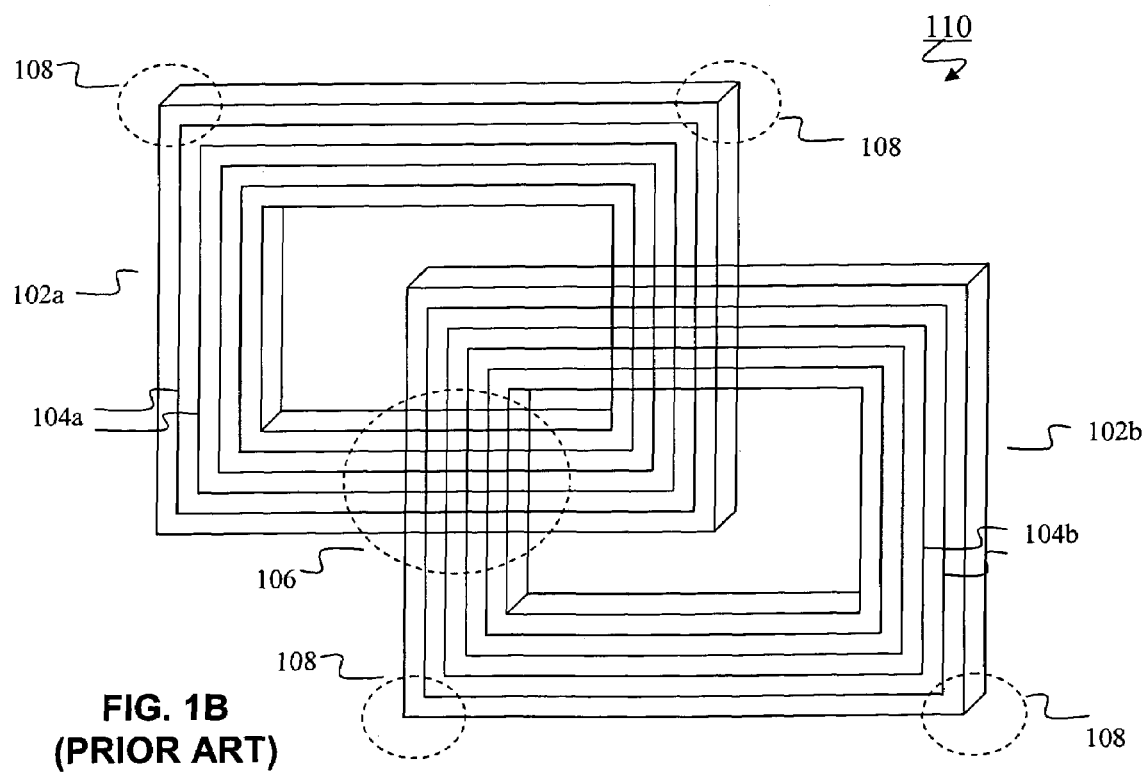
Figure 4A:
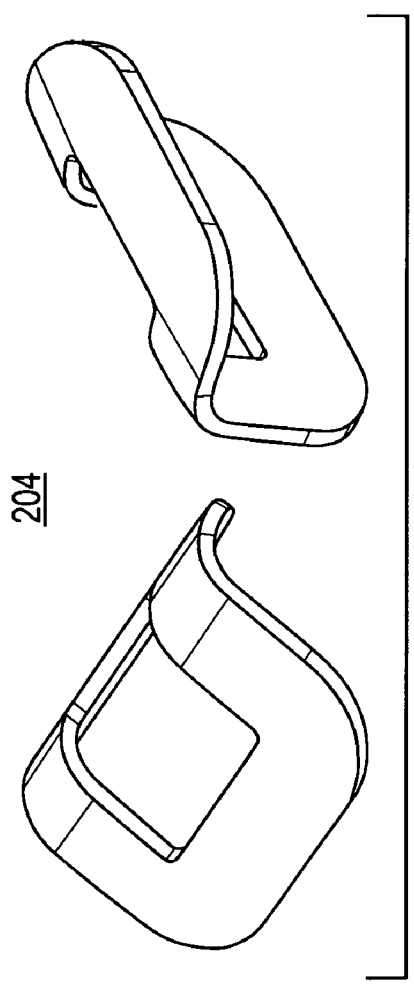
FIGS. 4A to 4D are different detailed views of a second coil in a coil pair in accordance with one example of the present invention such as that illustrated in FIGS. 2A and 2B.
Figure 4B:
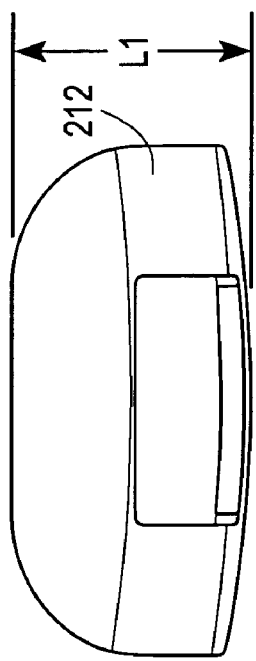
Figure 4C:
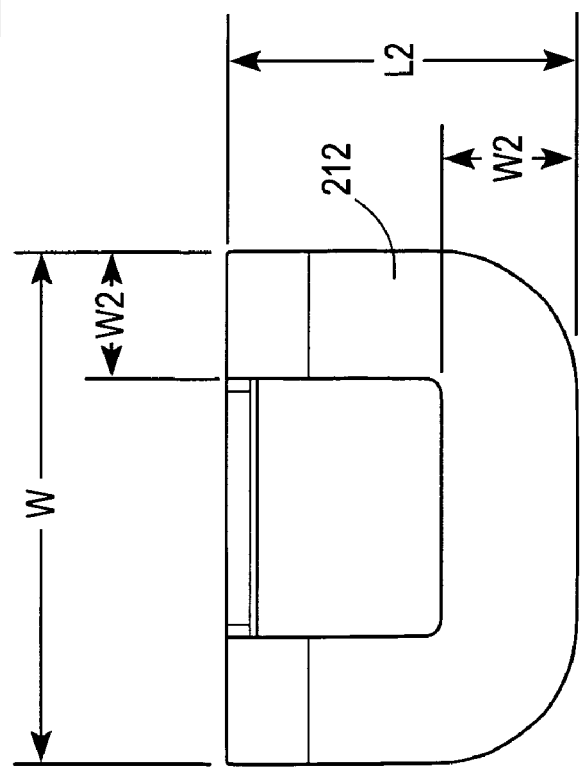
Figure 4D:
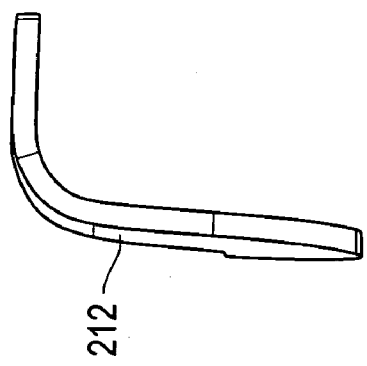

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

FIGS. 2A and 2B are provided for illustrating an example implementation of a torquer motor in accordance with the present invention. More particularly, FIGS. 2A and 2B are perspective drawings of a coil pair 200 for use in the inventive torquer motor. As shown in FIGS. 2A and 2B, coil pair 200 includes first coil 202 and second coil 204.

As can be seen, second coil 204 in this example implementation comprises two flat torus-shaped coil pieces 204a and 204b that are folded over the box-shaped first coil 202. As will be explained in more detail below, pieces 204a and 204b are comprised of windings (not shown) that form a coil having a surface 212 opposite the first coil 202 (and thus, an opposite surface not shown that is adjacent to the first coil 202), the windings being wound in a clockwise direction so as to define a void in substantially the same plane as surface 212, the void exposing a surface 206 of first coil 202 when second coil 204 is folded over first coil 202. First coil 202 also is comprised of windings (not shown) that are wound so as to form a coil having a surface 206 that has a substantially uniform width (i.e. a band) that bounds a hollow inside volume 208 (the coil also having a surface opposite surface 206 that faces the hollow inside volume 208). Together, the respective windings of first coil 202 and second coil 204 overlap each other in orthogonal directions in a common plane direction so as to define an active area 210.

FIGS. 3A to 3D are perspective, top, front and side drawings, respectively, of first coil 202 according to the implementation illustrated in FIGS. 2A and 2B. In one example, coil 202 is comprised of about 0.125 in. thick copper wind (using a conventional epoxy binding procedure, for example). In this example, coil 202 also has a depth D of about 1.56 inches, a width W of about 1.27 in., and a length L of about 3.09 in. For use in an example torquer motor application, coil 202 preferably also includes about 218 windings of 22 gauge copper wire that are wrapped in a manner known to those skilled in the art.

FIGS. 4A to 4D are perspective, top, front and side drawings, respectively, of second coil 204 (i.e. one of coil pieces 204a and 204b) according to the implementation illustrated in FIGS. 2A and 2B. In one example, coil 204 is comprised of about 0.125 in. thick copper wind. In this example, coil 204 also has a first outer length L1 of about 1.21 inches, a second outer length L2 of about 1.67 in., an outer width W1 of about 2.54 in., and a surface width W2 of about 0.635 in., thus defining a void area 220 of about 1.27 in. wide in the plane of surface 212. For use in an example torquer motor application, coil 204 preferably also includes about 161 windings of 24 gauge copper wire that are wrapped in a clockwise direction in a manner known to those skilled in the art.

In this example, coil 204 (and thus its surface 212) is bent at about a 90 degree angle so as to conform the coil 204 to the box shape of coil 202. It should be noted, however, that it is not necessary for coil 204 to be bent as illustrated in FIGS. 2A and 2B and FIGS. 4A to 4D. However, according to an aspect of the invention, the bending provides further rigidity to the overall structure, as well as space savings in certain environments. It should be further noted that the bending of coil 204 can be done at other angles to account for other shapes of coil 202.

Figure 5:
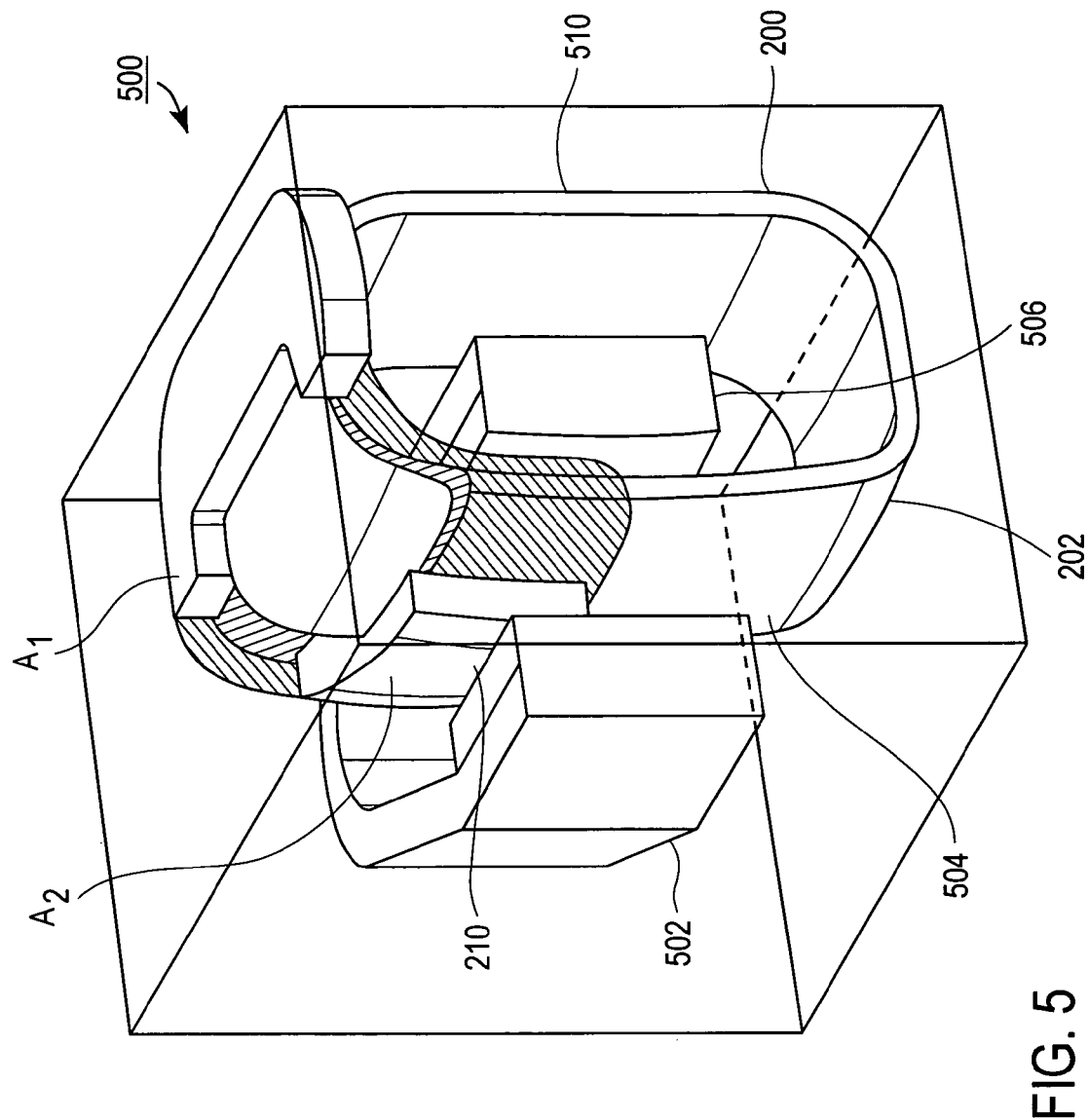
FIG. 5 illustrates an example implementation of a torquer motor according to the invention using a coil pair such as that illustrated in FIGS. 2 to 4.

FIG. 5 illustrates a torquer motor 500 including a coil pair 200 as described in conjunction with FIGS. 2 to 4. As shown in FIG. 5, coil pair 200 is disposed in relation to magnetic member 502 such that active area 210 is in the magnetic field between magnets 504 and 506.

One advantage of the invention is that coil pair 200 may be mounted to the inner gimbal payload structure via a back surface portion 210 of first coil 202. This provides further rigidity and reliability to the overall structure. This also allows for the ability of more heat to be transferred from coil pair 200 to the inner gimbal payload structure. It should be noted that, in an example application of motor 500 in a gimbal, there may be several motors 500 for use in stabilizing an object such as a surveillance instrument package.

Another advantage of the invention is that the overall design of the coil pair 200 lends itself to compact and space-saving applications in torquer motors. As shown in FIG. 5, the active area can be disposed between magnets 504 due to the box-shaped shaped design of first coil 202, while the torus-shaped design of second coil 204 allows that coil to be bent in conformity with first coil 202, thus making the overall structure very compact.

Yet another advantage of the invention is gained from the overall design of the coil pairs. For example, the box shape of first coil 202 allows for more ideal and optimal copper windings, thus making the windings in that coil more suitable for use in corresponding directions of movement that are critical in applications such as gimbals.

Figure 6A:
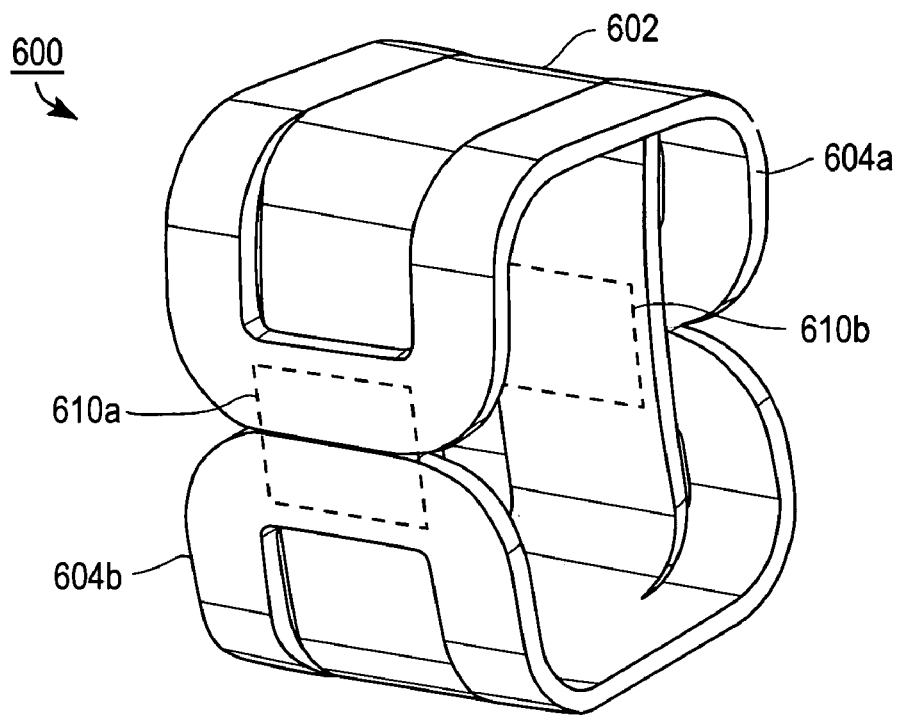
FIGS. 6A and 6B illustrate an alternative implementation of a coil pair and torquer motor according to the invention using design principles similar to FIGS. 2 to 5.
Figure 6B:
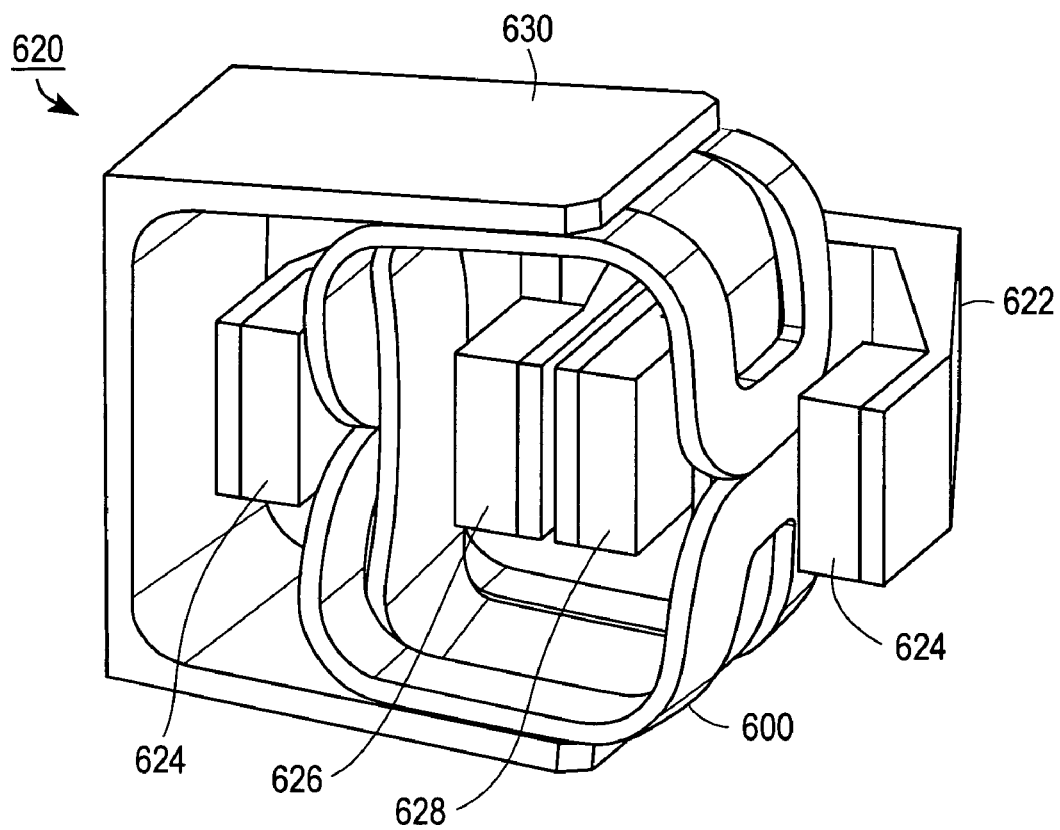

FIGS. 6A and 6B illustrate another example utilizing the design principles of the embodiment of the invention described above. More particularly, FIG. 6A is a perspective drawings of a coil pair 600 for use in the inventive torquer motor. As shown in FIG. 6A, coil pair 600 includes first coil 602 and second coil 604.

As can be seen, second coil 604 in this example implementation comprises two flat torus-shaped coil pieces 604a and 604b that are folded over the box-shaped first coil 602. Differently from the above embodiment, however, coil pieces 604*a* and 604*b* each have two approximately 90 degree bends (rather than just one), so as to fold over both a front and a back side of second coil 604. Together, the respective windings in first coil 602 and second coil 604 overlap each other in orthogonal directions in a common plane direction so as to define two active areas 610*a* and 610*b*.

FIG. 6B illustrates a torquer motor 620 including a coil pair 600 as described in conjunction with FIG. 6A. As shown in FIG. 6B, coil pair 600 is disposed in relation to back iron pair 622 such that one active area 610*a* is disposed in the magnetic field between magnets 624 and 626, while the other active area 610*b* is disposed in the magnetic field between magnets 628 and 629.

An advantage of this alternative design is that rigidity to the overall structure is maintained by allowing the motor to be mounted securely within bracket 630, while providing efficiency gained from having two active areas controlling action of the motor via the same current in the coils instead of just one active area.

The principles of the invention are not limited to the example torus/box shape coil pair designs illustrated and described hereinabove.

Figure 7A:
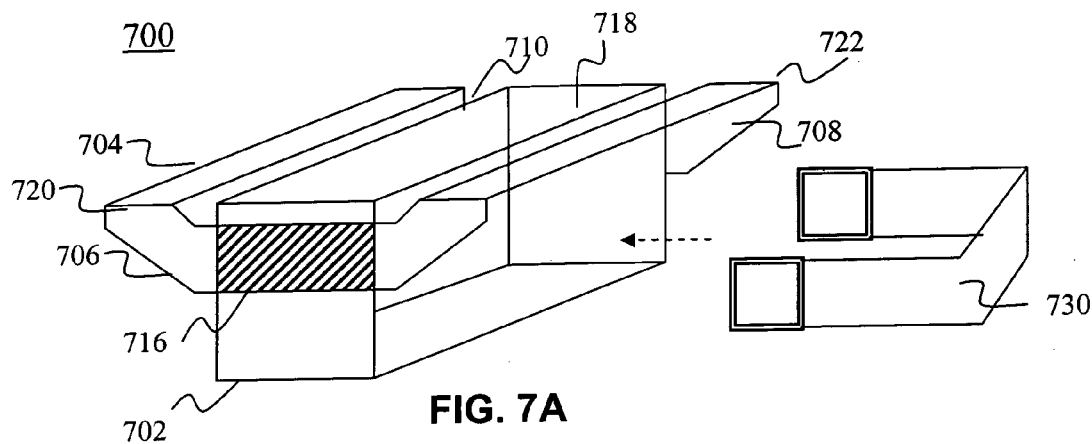
FIGS. 7A to 7C illustrate alternative embodiments of the invention including different arrangements of coil pairs.
Figure 7B:
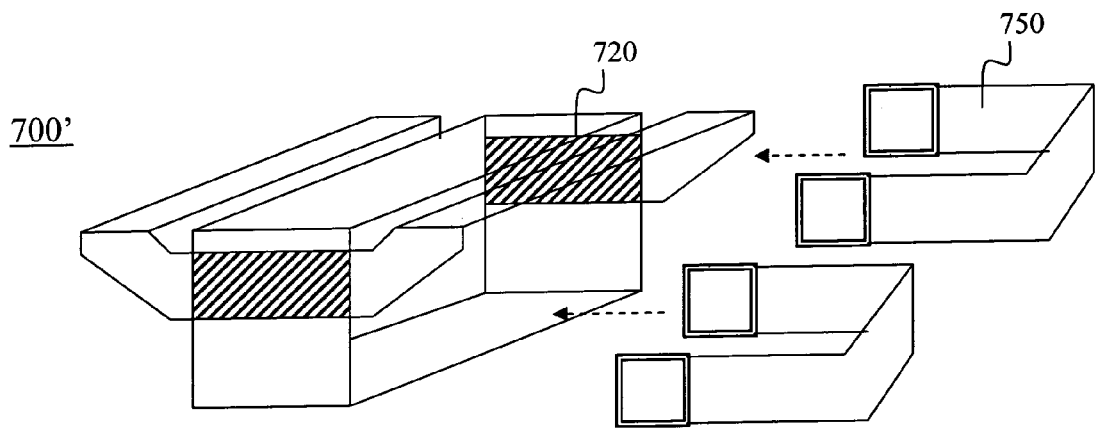
Figure 7C:
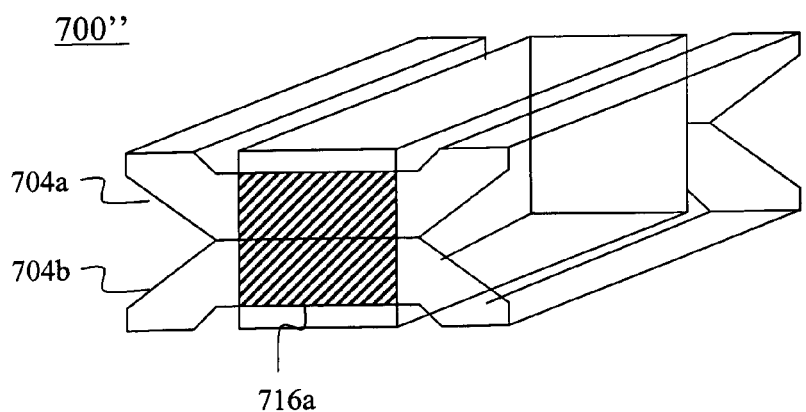

For example, FIGS. 7A to 7C illustrate three alternative implementations of a torquer motor including a coil pair 700. In this alternative example, first coil 702 is box-shaped as in the previous implementation. However in this example, second coil 704, although flat and torus shaped as above, is bent along two bend lines 720 and 722, and is arranged such that a hollow portion 710 of second coil 704 totally exposes a top portion 718 of first coil 702, while first and second end portions 706, 708 of second coil 704 overlap front and back portions 712, 714 of first coil 702. With windings provided in first and second coils 702, 704, an active area 716 is defined. This active area 716 may be disposed in the magnetic field provided by a magnet pair 730 to provide stabilizing forces in relation to currents flowing in coils 702 and 704 as discussed above.

FIG. 7B illustrates yet another alternative implementation of a motor using coil pair 700' wherein a second active area 720 is defined, which can also be disposed in a magnetic field provided by a second magnet pair 750 to provide even further stabilizing forces between the vibrating structure and the apparatus to be stabilized.

FIG. 7C illustrates a still further alternative implementation of a motor using coil pair 700" in which second coil 704 is comprised of two separate pieces 704*a* and 704*b*. First piece 704*a* is bent around first coil 702 as is coil 704 in FIGS. 7A and 7B. Second piece 704*b* is bent and disposed around first coil 702 in symmetric fashion as first piece 704*a*, thus expanding the active area 716*a*. It should be noted that either one or two active areas and magnetic pairs can be provided to form another alternative implementation of a torquer motor as discussed in connection with FIGS. 7A and 7B.

Figure 8A:
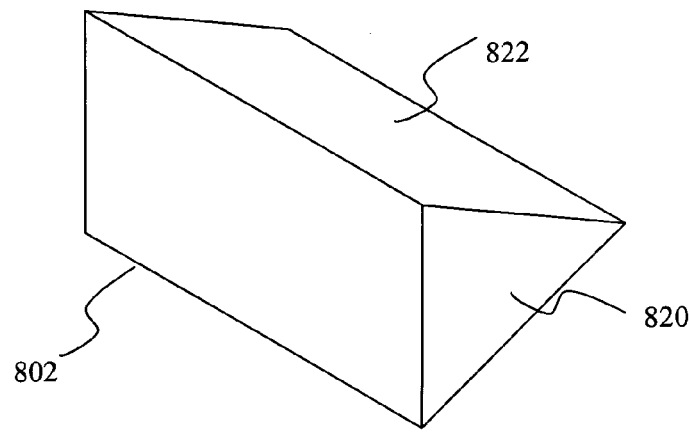
FIGS. 8A to 8C illustrate further alternative embodiments of the invention including further different arrangements of coil pairs.
Figure 8B:
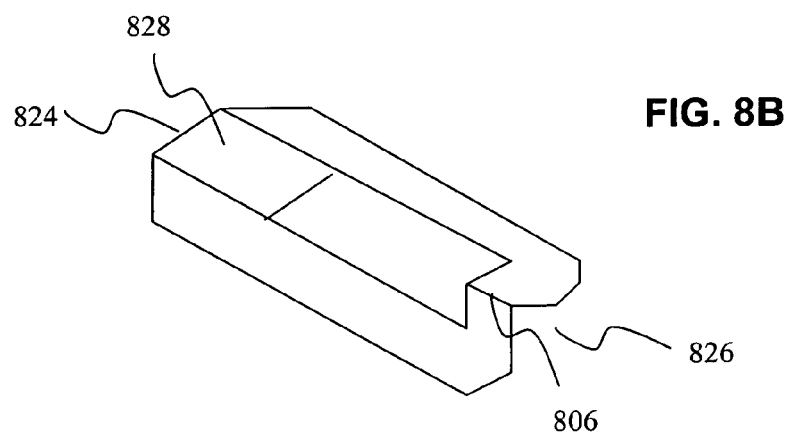
Figure 8C:
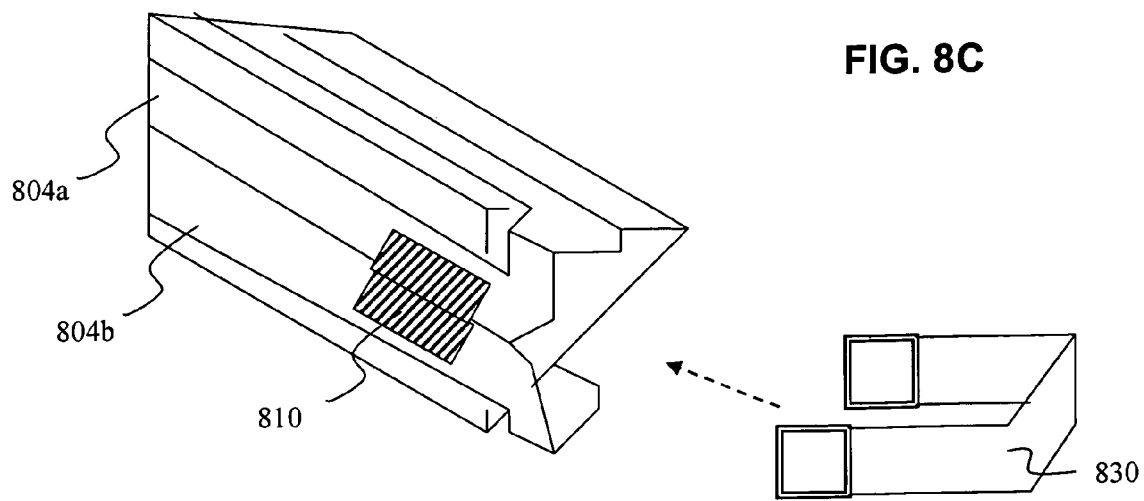

FIGS. 8A to 8C illustrate yet another example implementation of a torquer motor according to the principles of the invention. As shown in FIG. 8A, in a coil pair according to this example, first coil 802 that is three-sided rather than four-sided as in the above examples. As with the box-shaped first coil, however, the first coil 802 includes a hollow portion 820 and a top surface portion 822. FIG. 8B illustrates a second coil 804 for use with a first coil 802 in the example illustrated in FIG. 8A. Although flat and torus-shaped similarly as above, as shown in FIG. 8B, second coil 804 is bent along bend line 806 at a 120 degree or similar angle to conform to the triangular shape of first coil 802. It is also bent along bend line 824 at a 90 degree angle, thus defining an open end 826 and a closed end 828. When provided together with coil 802 as shown in FIG. 8C, second coil 804 can comprise two pieces 804*a* and 804*b*. With windings on the surfaces of coils 802 and 804 as described above, an active area 810 may be defined, which may further be disposed between the magnet pairs in a magnetic member 812 for providing stabilizing forces between the vibrating structure and the apparatus to be stabilized.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A coil pair for a torquer motor comprising:
   a plurality of first windings defining a first coil having a substantially uniform first width, the first coil having a first surface completely bounding and facing a hollow interior volume, and a second surface opposite the first surface; and
   a plurality of second windings defining a second coil, the second coil having a third surface, the second windings further defining a void in substantially in the same plane as the third surface,
   wherein the first and second coil are disposed together so that a portion of the third surface of the second coil is adjacent to a portion of the second surface of the first coil in a substantially common plane direction,
   and wherein the first windings and second windings corresponding to the portions lie at substantially orthogonal directions to each other so as to define a first active area.

2. A coil pair according to claim 1, wherein the first coil is box-shaped such that the first surface has four sides, two of the sides being parallel to the two other sides.

3. A coil pair according to claim 2, wherein the second coil is bent along a first bend line so as to conform to the box-shaped first coil.

4. A coil pair according to claim 3, wherein the second coil is bent so as to be disposed over two sides of the first coil.

5. A coil pair according to claim 3, wherein the second coil is bent so as to be disposed over three sides of the first coil.

6. A coil pair according to claim 5, wherein the first and second coil are disposed together so that a second portion of the third surface of the second coil is adjacent to a second portion of the second surface of the first coil in a substantially common plane direction,
   wherein the first windings and second windings corresponding to the second portions lie at substantially orthogonal directions to each other so as to define a second active area different from the first active area, and
   wherein the portion of the first surface corresponding to the first active area is disposed on a first side of the box-shaped first coil, and the second portion of the first surface area corresponding to the second active area is disposed on another side of the box-shaped first coil parallel to the first side.

7. A coil pair according to claim 1, wherein the first and second coil are disposed together so that a second portion of the third surface of the second coil is adjacent to a second portion of the second surface of the first coil in a substantially common plane direction, and wherein the first windings and second windings corresponding to the second portions lie at substantially orthogonal directions to each other so as to define a second active area different from the first active area.

8. A coil pair according to claim 1, wherein the second coil is comprised of two separate pieces, a first set of the plurality of second windings defining one piece of the second coil, a second set of the plurality of second windings defining another piece of the second coil, and wherein the second windings corresponding to the first active area comprise windings from the first and second set.

9. A coil pair according to claim 8, wherein the first coil is box-shaped such that the first surface has four sides, two of the sides being parallel to the two other sides.

10. A coil pair according to claim 9, wherein the two pieces of the second coil are both bent along respective first bend lines so as to conform to the box-shaped first coil.

11. A coil pair according to claim 10, wherein the two pieces of the second coil are each bent so as to be disposed over two sides of the first coil.

12. A coil pair according to claim 10, wherein the two pieces of the second coil are each bent so as to be disposed over three sides of the first coil.

13. A coil pair according to claim 8, wherein the first and second coil are disposed together so that a second portion of the third surface of both pieces of the second coil are adjacent to a second portion of the second surface of the first coil in a substantially common plane direction, and wherein the first windings and second windings corresponding to the second portions lie at substantially orthogonal directions to each other so as to define a second active area different from the first active area.

14. A coil pair according to claim 12, wherein the first and second coil are disposed together so that a second portion of the third surface of both pieces of the second coil are adjacent to a second portion of the second surface of the first coil in a substantially common plane direction, wherein the first windings and second windings corresponding to the second portions lie at substantially orthogonal directions to each other so as to define a second active area different from the first active area, and wherein the portion of the first surface corresponding to the first active area is disposed on a first side of the box-shaped first coil, and the second portion of the first surface area corresponding to the second active area is disposed on another side of the box-shaped first coil parallel to the first side.

15. A coil pair according to claim 1, wherein the first coil is shaped such that the first surface has three sides, none of the sides being parallel to the two other sides.

16. A coil pair according to claim 15, wherein the second coil is bent along a first bend line so as to conform to the shape of the first coil.

17. A coil pair according to claim 15, wherein the second coil is bent so as to be disposed over two sides of the first coil.

18. A coil pair according to claim 15, wherein the second coil is comprised of two separate pieces, a first set of the plurality of second windings defining one piece of the second coil, a second set of the plurality of second windings defining another piece of the second coil, and wherein the second windings corresponding to the first active area comprise windings from the first and second set.

19. A torquer motor comprising:

a plurality of first windings defining a first coil having a substantially uniform first width, the first coil having a first surface completely bounding and facing a hollow interior volume, and a second surface opposite the first surface;

a plurality of second windings defining a second coil, the second coil having a third surface, the second windings further defining a void in substantially in the same plane as the third surface, wherein the first and second coil are disposed together so that a portion of the third surface of the second coil is adjacent to a portion of the second surface of the first coil in a substantially common plane direction, and wherein the first windings and second windings corresponding to the portions lie at substantially orthogonal directions to each other so as to define a first active area; and a pair of magnets arranged around the first active area, one of the magnets being disposed within the hollow interior volume.

* * * * *